(12) United States Patent
Wu et al.

(10) Patent No.: US 7,026,010 B1
(45) Date of Patent: Apr. 11, 2006

(54) COUPLING ENHANCEMENT FOR MEDIUM WITH ANTI-FERROMAGNETIC COUPLING

(75) Inventors: Zhong Stella Wu, Fremont, CA (US); Samuel Dacke Harkness, San Francisco, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/808,448

(22) Filed: Mar. 25, 2004

Related U.S. Application Data

(62) Division of application No. 10/207,087, filed on Jul. 30, 2002, now Pat. No. 6,846,576.

(60) Provisional application No. 60/372,353, filed on Apr. 10, 2002.

(51) Int. Cl.
*B05D 5/12* (2006.01)

(52) U.S. Cl. .................. 427/131; 427/132; 427/295; 427/405

(58) Field of Classification Search ................ 427/250, 427/123, 124, 255.7, 294
See application file for complete search history.

(56) References Cited

U.S. PATENT DOCUMENTS

| | | | |
|---|---|---|---|
| 4,202,932 A * | 5/1980 | Chen et al. ................ | 428/667 |
| 4,701,385 A | 10/1987 | Imura et al. | |
| 5,106,703 A | 4/1992 | Carcia | |
| 5,269,879 A | 12/1993 | Rhoades et al. | |
| 5,650,889 A | 7/1997 | Yamamoto et al. | |
| 5,658,425 A | 8/1997 | Halman et al. | |
| 5,660,930 A | 8/1997 | Bertero et al. | |
| 5,809,801 A | 9/1998 | Cates, Jr. et al. | |
| 5,860,295 A | 1/1999 | Cates, Jr. et al. | |
| 6,022,630 A | 2/2000 | Miller et al. | |
| 6,243,939 B1 | 6/2001 | Chen et al. | |
| 6,387,548 B1 | 5/2002 | Hasegawa et al. | |
| 6,723,450 B1 * | 4/2004 | Do et al. ..................... | 428/611 |
| 6,753,072 B1 * | 6/2004 | Chen et al. .................. | 428/216 |
| 6,759,149 B1 * | 7/2004 | Chen et al. .......... | 428/694 TM |
| 6,795,630 B1 * | 9/2004 | Challener et al. ........... | 385/129 |
| 6,815,082 B1 * | 11/2004 | Girt ........................... | 428/611 |
| 2002/0037439 A1 | 3/2002 | Litvinov et al. | |
| 2002/0064689 A1 | 5/2002 | Yamanaka et al. | |

\* cited by examiner

*Primary Examiner*—Bret Chen
(74) *Attorney, Agent, or Firm*—Morrison & Foerster LLP

(57) ABSTRACT

Laminated magnetic recording medium with two Co-containing layers separated by a non-magnetic Ru-containing interlayer is stabilized by Ru-containing layer between the recording layers and Co-containing stabilization layers through anti-ferromagnetic coupling. The insertion of Co layer beneath Ru spacer has resulted in increased coupling, and further coupling enhancement is achieved by low pressure process of Co and Ru layers.

11 Claims, 6 Drawing Sheets

Carbon overcoat 31

1st Co-containing recording layer 32

Ru layer 33

High magnetic density layer 34

2nd Co-containing recording layer 36

Underlayer 39

Substrate 30

Protective overcoat 23

Magnetic layer 22

Underlayer 21

Substrate 20

COUPLING ENHANCEMENT FOR MEDIUM WITH ANTI-FERROMAGNETIC COUPLING

RELATED APPLICATIONS

This application claims priority from and is a division of parent application Ser. No. 10/207,087, filed Jul. 30, 2002 U.S. Pat. No. 6,846,576, which claims priority from Provisional Application Ser. No. 60/372,353 filed Apr. 10, 2002, entitled "ENHANCED ANTI-FERROMAGNETIC COUPLING THROUGH NOVEL PROCESS," the entire disclosure of which is hereby incorporated herein by reference.

FIELD OF INVENTION

This invention relates to magnetic recording media, such as thin film magnetic recording disks, and to a method of manufacturing the media. The invention has particular applicability to high areal density longitudinal magnetic recording media having very low medium noise and high degree of thermal stability, and more particularly, to a laminated medium with anti-ferromagnetic (AF) coupling.

BACKGROUND

The increasing demands for higher areal recording density impose increasingly greater demands on thin film magnetic recording media in terms of coercivity (Hc), remanent coercivity (Hcr), magnetic remanance (Mr), which is the magnetic moment per unit volume of ferromagnetic material, coercivity squareness (S*), signal-to-medium noise ratio (SMNR), and thermal stability of the media. These parameters are important to the recording performance and depend primarily on the microstructure of the materials of the media. For example, as the SMNR is reduced by decreasing the grain size or reducing exchange coupling between grains, it has been observed that the thermal stability of the media decreases.

The requirements for high areal density, i.e., higher than 30 Gb/in$^2$, impose increasingly greater requirements on magnetic recording media in terms of coercivity, remanent squareness, medium noise, track recording performance and thermal stability. It is difficult to produce a magnetic recording medium satisfying such demanding requirements, particularly a high-density magnetic rigid disk medium for longitudinal and perpendicular recording.

As the storage density of magnetic recording disks has increased, the product of Mr and the magnetic layer thickness t has decreased and Hcr of the magnetic layer has increased. This has led to a decrease in the ratio Mrt/Hcr. To achieve a reduction in Mrt, the thickness t of the magnetic layer has been reduced, but only to a limit because the magnetization in the layer becomes susceptible to thermal decay. This decay has been attributed to thermal activation of small magnetic grains (the super-paramagnetic effect). The thermal stability of a magnetic grain is to a large extent determined by $K_uV$, where $K_u$ is the magnetic anisotropy constant of the magnetic layer and V is the volume of the magnetic grain. As the magnetic layer thickness is decreased, V decreases. Thus, if the magnetic layer thickness is too thin, the stored magnetic information might no longer be stable at normal disk drive operating conditions.

The increase in $K_u$ is limited to the point where the coercivity $H_c$, which is approximately equal to $K_u/Mr$, becomes too large to be written by a conventional recording head. On the other hand, a reduction in Mr of the magnetic layer for a fixed layer thickness is limited by the coercivity that can be written. Increasing V by increasing inter-granular exchange can also increase thermal stability. However, this approach could result in a reduction in the SMNR of the magnetic layer.

Some attempts have been made to solve the above-mentioned problem of thermal stability. For example, U.S. Pat. No. 5,462,796 (Teng) teaches a laminated longitudinal magnetic recording medium with Cr-containing non-magnetic layer between two magnetic layers. This medium exhibits a lower medium noise than that of a medium without the Cr-containing interlayer. However, when the medium Mrt is below 0.6 memu/cm$^2$, the laminated medium has very poor thermal stability, which will be shown below. As recording density increases to about 30 Gb/in$^2$, medium Mrt has been reduced to about 0.35 memu/cm$^2$. Regular laminated medium can not be used in such low Mrt regime due to thermal stability issue.

In order to squeeze as much digital information as possible on a recording disc medium there is a need to find a film structure, which can benefit the low noise feature of laminated medium, but has acceptable thermal stability. Furthermore, in order to obtain high enough signal output, and reduce the medium noise of the medium with anti-ferromagnetic stabilization layers, further improvement of the medium is necessary.

SUMMARY OF THE INVENTION

Applicants found that the anti-ferromagnetic interactions of two Co-containing magnetic layers separated by a non-magnetic interlayer such as a Ru layer at appropriate thickness and a magnetic layer having a higher magnetic density than that of the two Co-containing magnetic layers, e.g., a Co layer, result in enhanced anti-ferromagnetic coupling.

One embodiment is a fabrication of the thin film recording media with anti-ferromagnetic coupling with an intermediate layer produced by DC magnetron sputtering using various inert gas species—Ar, Kr and Xe. The media of a preferred embodiment with a Co/Ru layer fabricated in Kr or Xe gases showed stronger AF coupling. In addition, sputtering processes with very low gas pressure produced increased coupling. These improvements in AF were contributed to reduced interfacial roughness and interlayer diffusion. Another embodiment is a method of manufacturing a recording media with improved AF coupling.

Yet, another embodiment is a magnetic recording medium, comprising a pair of magnetic recording layers separated by means for improving the anti-ferromagnetic coupling of said pair of Co-containing magnetic layers. In this invention, "means for improving the anti-ferromagnetic coupling of said pair of Co-containing magnetic layers" includes embodiments shown, including interlayers of Co and Ru, and combinations thereof or equivalents thereof.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

Figure 1:
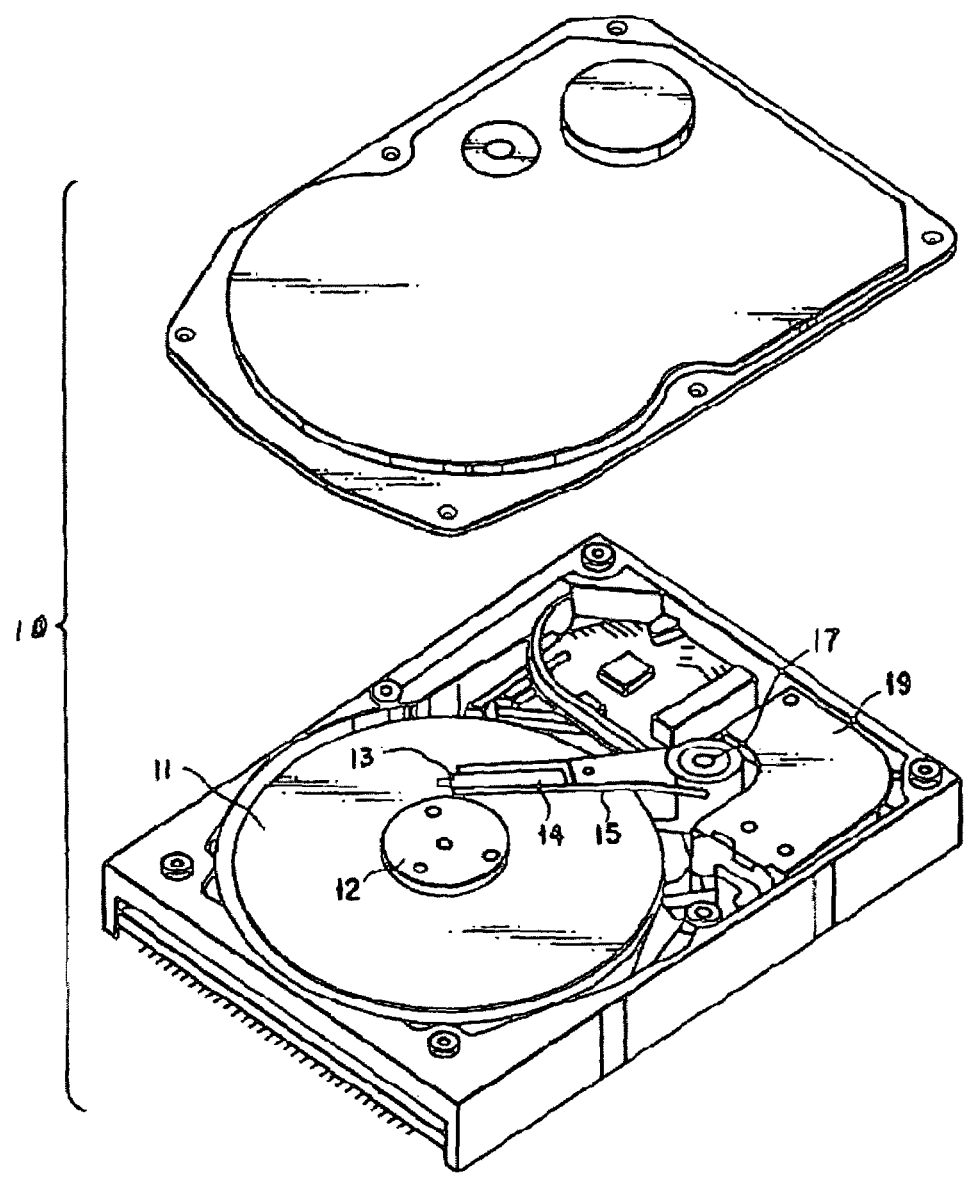
FIG. 1 is a view of a magnetic disk drive.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. A voice coil motor 19 as a kind of linear motor is provided to the other end of the arm 15. The arm 15 is swingably supported by ball bearings (not shown) provided at the upper and lower portions of a pivot portion 17.

Figure 2:
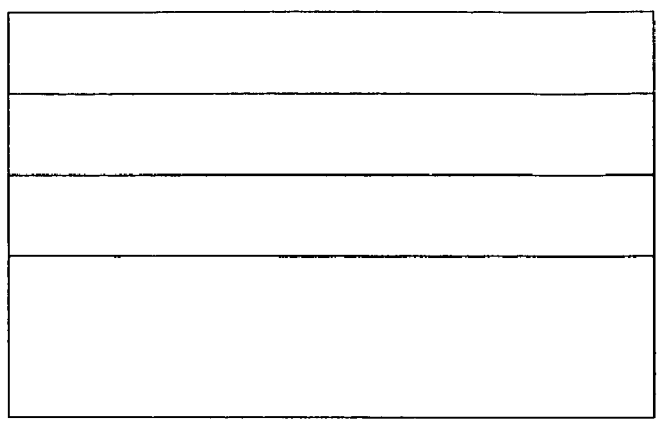
FIG. 2 is a schematic representation of the film structure in accordance with a magnetic recording medium of the prior art.

A cross sectional view of a longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-containing, a magnetic layer 22, 22', typically comprising a cobalt (Co)-base alloy, and a protective overcoat 23, 23', typically containing carbon. Conventional practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by techniques normally comprises polycrystallites epitaxially grown on the polycrystal Cr or Cr-containing underlayer.

A longitudinal recording disk medium is prepared by depositing multiple layers of films to make a composite film. In sequential order, the multiple layers typically comprise a non-magnetic substrate, one or more underlayers, one or more magnetic layers, and a protective carbon layer. Generally, a polycrystalline epitaxially grown cobalt-chromium (CoCr) alloy magnetic layer is deposited on a chromium or chromium-alloy underlayer.

Methods for manufacturing a longitudinal magnetic recording medium with a glass, glass-ceramic, Al or Al-NiP substrate may also comprise applying a seedlayer between the substrate and underlayer. A seedlayer seeds the nucleation of a particular crystallographic texture of the underlayer. Conventionally, a seedlayer is the first deposited layer on the non-magnetic substrate. The role of this layer is to texture (alignment) the crystallographic orientation of the subsequent Cr-containing underlayer, and might also produce small grain size, which is desired for the purpose of reducing recording noise.

The seedlayer, underlayer, and magnetic layer are conventionally sequentially sputter deposited on the substrate in an inert gas atmosphere, such as an atmosphere of argon. A carbon overcoat is typically deposited in argon with nitrogen, hydrogen or ethylene. Lubricant topcoats are typically about 20 Å thick.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material that comprises a mixture of amorphous and crystalline materials, and ceramic materials. Glass-ceramic materials do not normally exhibit a crystalline surface. Glasses and glass-ceramics generally exhibit high resistance to shocks.

A magnetic material is composed of a number of submicroscopic regions called magnetic grains. Each grain contains parallel atomic magnetic moments and is always magnetized to saturation (Ms), but the directions of magnetization of different grains are not necessarily parallel. In the absence of an applied magnetic field, adjacent grains may be oriented randomly in any number of several directions, called the directions of easy magnetization, which depend on the geometry of the crystal, stress, etc. The resultant effect of all these various directions of magnetization may be zero, as is the case with an unmagnetized specimen. When a magnetic field is applied, the grains will have their moment align parallel to the direction of the applied field when the applied field is sufficiently high for this magnetic grain, until all grains are aligned to the same direction, and the material reaches the point of saturation magnetization.

The ease of magnetization or demagnetization of a magnetic material depends on the crystalline structure, grain orientation, the state of strain, and the direction of the magnetic field. The magnetization is most easily obtained along the easy axis of magnetization but most difficult along the hard axis of magnetization. A magnetic material is said to possess a magnetic anisotropy when easy and hard axes exist. On the other hand, a magnetic material is said to be isotropic when there are no easy or hard axes. A magnetic material is said to possess a uniaxial anisotropy when the easy axis is oriented along a single crystallographic direction, and to possess multiaxial anisotropy when the easy axis aligns with multiple crystallographic directions.

"Anisotropy energy" is the work against the anisotropy force to turn magnetization vector away from an easy direction. For example, a single crystal of iron, which is made up of a cubic array of iron atoms, tends to magnetize in the directions of the cube edges along which lie the easy axes of magnetization. A single crystal of iron requires about $1.4 \times 10^5$ ergs/cm$^3$ (at room temperature) to move magnetization from an easy direction into the hard axis of magnetization, which is along a cubic body diagonal.

The anisotropy energy $U_A$ could be expressed in an ascending power series of the direction cosines between the magnetization and the crystal axes. For cubic crystals, the lowest-order terms take the form of Equation (1), $$U_A = K_1(\alpha_1^2\alpha_2^2 + \alpha_2^2\alpha_3^2 + \alpha_3^2\alpha_1^2) + K_2(\alpha_1^2\alpha_2^2\alpha_3^2) \quad (1)$$

where $\alpha_1$, $\alpha_2$ and $\alpha_3$ are direction cosines with respect to the cubic axes, and $K_1$ and $K_2$ are temperature-dependent parameters characteristic of the material, called anisotropy constants.

Anisotropy constants can be determined from (1) analysis of magnetization curves, (2) the torque on single crystals in a large applied field, and (3) single crystal magnetic resonance. The term "anisotropy constant" is often referred to as magnetocrystalline anisotropy constant.

While Equation (1) applies for a cubic lattice, similar equations are also known for other lattice systems. For example, for a hexagonal close packed (HCP) lattice, the equation for $U_A$ is the following:

$$U_A = K_1 \sin^2\theta + K_2 \sin^4\theta \qquad (2)$$

where $\theta$ is the angle between the Ms vector, i.e., the saturation magnetization direction, and the c axis (easy axis), and $K_1$ and $K_2$ are anisotropy constants.

The magnetic anisotropy of longitudinal and perpendicular recording media makes the easily magnetized direction of the media located in the film plane and perpendicular to the film plane, respectively. The remanent magnetic moment of the magnetic media after magnetic recording or writing of longitudinal and perpendicular media is located in the film plane and perpendicular to the film plane, respectively.

For thin film longitudinal magnetic recording media, the desired crystalline structure of the Co and Co alloys is HCP with uniaxial crystalline anisotropy and a magnetization easy direction along the c-axis lies in the plane of the film. The better the in-plane c-axis crystallographic texture, the higher the magnetic remanance of the Co alloy thin film used for longitudinal recording. For very small grain sizes coercivity increases with increased grain size. As grain size increases, noise increases. To achieve a low noise magnetic medium, the Co alloy thin film should have uniform small grains with grain boundaries that can efficiently isolate neighboring grain to reduce medium noise. This kind of microstructure and crystallographic texture is normally achieved by manipulating the deposition process, or most often by the proper use of an underlayer.

The linear recording density can be increased by increasing the Hr of the magnetic recording medium, and by decreasing the medium noise, as by maintaining very fine magnetically non-coupled grains. Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

The recording media of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs or tapes using known flexible substrates.

This invention provides magnetic recording media suitable for high areal recording density exhibiting high thermal stability and high SMNR. This invention achieves such technological advantages by providing (1) a Ru-containing layer between two Co-containing magnetic layers, one of the Co-containing magnetic layers being a magnetic recording layer and the other being a stabilization layer, and (2) a very thin Co hexagonal-structured layer in between the bottom magnetic stabilization layer and Ru spacer, and (3) the novel process to produce this Co intermediate and Ru spacer layers so that much larger exchange energy is achieved for maximum thermal stability advantage. In this application, word "containing," for example in Ru-containing, means that the layer comprises the elements or compounds before the word "containing" but the layer could still include other elements and compounds.

The ratio $K_u V/k_B T$ determines the thermal stability of magnetic recording media. In other words, it estimates the signal decay of the magnetic recording media. In the above ratio, Ku is an anisotropy constant defined by the equation $K_u = K_1 + 2K_2$, wherein $K_1$ and $K_2$ are the anisotropy constants of Equation (2), V is the volume of magnetic switching units, which can approximately be represented by magnetic grains, $K_B$ is Boltzman's constant and T is temperature in Kelvin.

Lu and Charap, "Thermal instability at 10 Gbit/in$^2$ magnetic recording," IEEE TRANSACTION ON MAGNETICS, Vol. 30, No. 6, pp. 4230–4232, November 1994, discloses that $K_u V/k_B T$ must be at least 60 in order for the written bits to be marginally stable. In one embodiment, a high magnetic density layer, preferably, a Co layer and a non-magnetic layer, preferably, a Ru-containing layer, together are included between a first Co-containing recording layer and a second Co-containing recording layer. The term "high magnetic density layer" refers to a layer having a higher magnetic density than that of the Co-containing recording layers.

Figure 3:
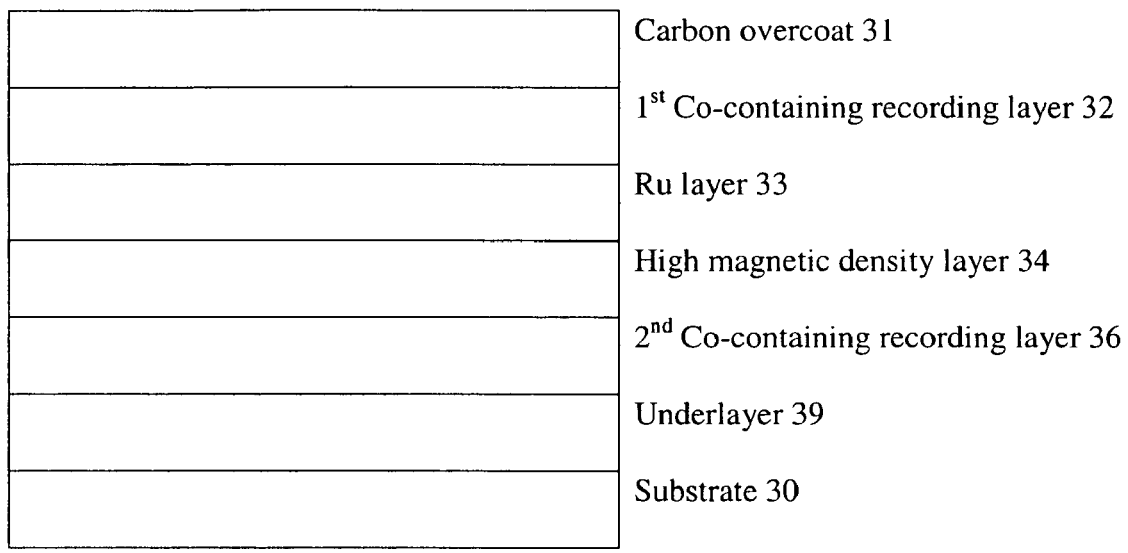
FIG. 3 is a schematic representation of the film structure of a laminated medium with anti-ferromagnetic layers in accordance with an embodiment of this invention.
Figure 4:
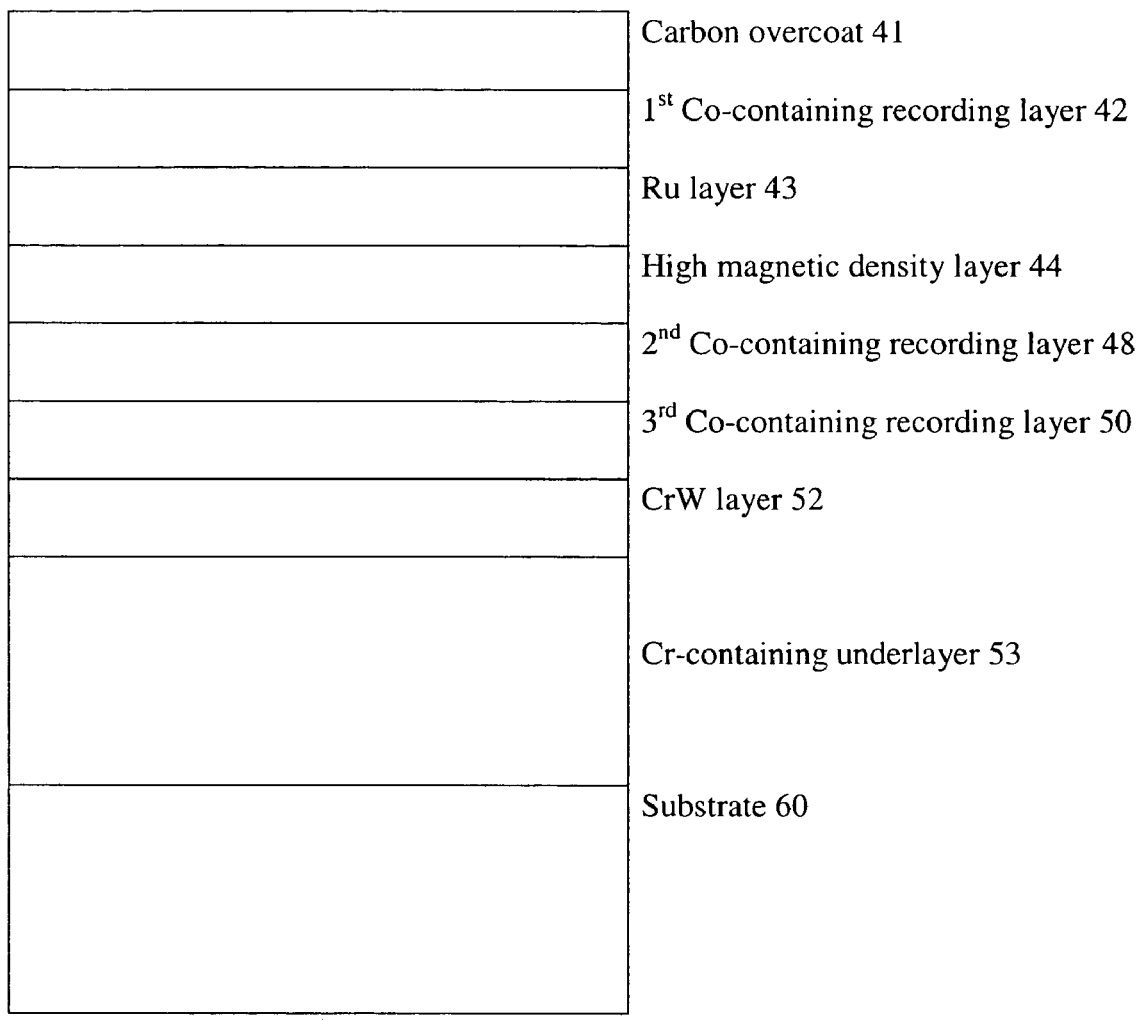
FIG. 4 is a schematic representation of the film structure of a laminated medium with anti-ferromagnetic layers in accordance with an embodiment of this invention.

FIGS. 3 and 4 show the film structures of two embodiments of this invention. FIG. 3 shows a underlayer 39 (typically, Cr-containing) deposited on a substrate. Sequentially, from the top of the film structure of FIG. 3 to the underlayer 39 are a carbon overcoat 31, a 1$^{st}$ Co-containing recording layer 32, a Ru layer 33, a high magnetic density layer 34, e.g., a Co layer, and a 2$^{nd}$ Co-containing recording layer 36. In one embodiment, the underlayer causes the easy axis of the 2$^{nd}$ Co-containing recording layer 36 to be in-plane through epitaxial growth. Another embodiment of this invention is shown in FIG. 4. There may be multiple Ru layers and multiple Co layers between the Co-containing recording layers.

The Co-containing recording layer can comprise any Co-based alloy such as CoCrPt, CoCrPtTa, CoCrPtTaNb, CoCrPtB. Each recording layer can be single magnetic layer or dual magnetic layers immediately adjacent to each other. The alloy of the 2$^{nd}$ Co-containing recording layer may or may not be the same as the alloy of the 1$^{st}$ recording layer. The thickness of each recording layer can be in the range of 0.5 nm to 12 nm with the 1$^{st}$ recording layer to be sufficiently thick to provide enough signal. The Ru layer thickness is about 0.6 to 1.2 nm, and should be optimized to obtain optimal anti-ferromagnetic coupling of the two layers adjacent to it.

The high magnetic density layer, preferably a Co layer, can have a thickness from about 0 to 20 A, and comprise any kind of Co-based alloy with high Ms. The edge length of the base plane of the lattice of a hexagonal structure is "a." The distance between two base planes of the lattice of a hexagonal structure is "c." When the absolute values of the relevant difference of "a" values of two hexagonal structures and the absolute value of the relevant difference of "c"

values of two hexagonal structures are both less than 6%, it means that these two structures have "similar lattice constants."

In a variation, there could further be a subseedlayer and a seedlayer of about 1.0 nm to 160 nm thickness each below the underlayer 39 to nucleate growth. A portion of the subseedlayer, the seedlayer and/or the underlayer could be oxidized by being sputter deposited with Ar and oxygen to promote a decrease in grain size. The term "a portion of" is defined herein to include all or part of a layer. Therefore, the entire layer, i.e., extending from one end of the layer to the opposite end of the layer may be in the oxidized form.

The carbon overcoat in FIGS. 3 and 4 could be further coated with a lubricant layer generally 1 nm to 3 nm thick. The lubricant is preferably a fluoro-chlorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

The substrates that may be used in the invention include glass, glass-ceramic, aluminum/NiP, metal alloys, plastic/polymer material, ceramic, glass-polymer, composite materials or other non-magnetic materials.

The underlayer in FIGS. 3 and 4 may form a (112) orientation when deposited on a B2 structured seedlayer such as NiAl. Then, a magnetic layer having a substantially Co(10.0) crystallographic orientation could be deposited on the underlayer. The underlayers shown in FIGS. 3 and 4 may also form a (200) orientation when deposited on Al/NiP substrates. Then, a magnetic layer having a substantially Co(11.0) crystallographic orientation could be deposited on the underlayer.

Desirably, the lattice constant and the crystal plane of the seedlayer, if used, should closely match that of the underlayer. As a consequence of lattice and crystalline plane matching, the magnetic layer will grow in a close-packed hexagonal structure with a Co(10.0) or Co(11.0) crystallographic orientations predominantly parallel to the film plane with the magnetic easy axis, c-axis, lying predominantly in the film plane.

In a preferred embodiment, the thickness of the BCC structure seedlayer could be about 0 Å to about 150 Å, preferably between about 20 Å and about 80 Å, and most preferably about 40 Å. The thickness of the underlayer could be about 20 Å to about 150 Å, preferably between about 20 Å and about 80 Å, and most preferably about 45 Å. The thickness of the recording layer could be about 40 Å to about 250 Å, preferably between about 60 Å and about 200 Å, and most preferably about 100–160 Å. The thickness of the stabilization layer could be about 10 Å to about 50 Å, preferably between about 15 Å and about 45 Å, and most preferably about 20–40 Å. The thickness of the Ru-containing layer could be about 6 Å to about 12 Å, preferably between about 7 Å and about 9 Å, and most preferably about 8 Å. The thickness of the interlayer (optional) below the magnetic layers could be about 5 Å to about 50 Å, preferably between about 15 Å and about 40 Å, and most preferably about 15–25 Å. The thickness of the protective layer could be about 20 Å to about 300 Å, preferably between about 25 Å and 50 Å, and most preferably about 30 Å. The protective layer could be made of hydrogenated carbon ($CH_x$), nitrogenated carbon ($CN_x$), hybrid carbon ($CH_xN_y$), or a combination of these.

The magnetic recording medium has a remanent coercivity of about 2000 to about 10,000 Oersted, and an Mrt (product of remanance, Mr, and magnetic layer thickness, t) of about 0.1 to about 2.0 memu/cm². In a preferred embodiment, the coercivity is about 2500 to about 9000 Oersted, more preferably in a range of about 3000 to about 7000 Oersted, and most preferably in a range of about 4000 to about 5500 Oersted. In a preferred embodiment, the Mrt is about 0.20 to about 1 memu/cm², more preferably in a range of about 0.20 to about 0.5 memu/cm², and most preferably in a range of about 0.25 to about 0.45 memu/cm².

In certain embodiments, applicants investigated three types of inert gas species—Ar, Kr, and Xe for the sputtering of thin Co and Ru interlayers (also called spacer layers), with the former contributing to the enhancement of the coupling, and latter at the appropriate thickness (around 8 Å) providing the most advantageous spacing for AF coupling between the magnetic layers below and above it. Furthermore, different process windows were investigated. In particular, applicants have found that low-pressure (less than 5 mTorr) process could improve the interface quality and result in further increase of AF coupling between the identical magnetic films.

EXAMPLES

The films were sputtered on NiP-plated Al substrates in a DC magnetron sputtering apparatus. The film structure produced and analyzed was $Cr/CrW/(CoCrPtB)^1/(CoCrPtB)^2/Co/Ru/(CoCrPtB)^3/C$, wherein the superscripts denote the layer number of the CoCrPtB-containing layers.

Specifically, the film structure and compositions were $Cr/Cr_{90}W_{10}/Co_{77}Cr_8Pt_7B_8/Co_{64}Cr_{12}Pt_6B_8/Co/Ru/Co_{61}Cr_{15}Pt_{12}B_{12}/C$, wherein all the numbers are in atomic percentage. The AF coupling is considered to is mainly from $(CoCrPtB)^1$, $(CoCrPtB)^2$, Co and $(CoCrPtB)^3$ magnetic layers, wherein $(CoCrPtB)^1$, $(CoCrPtB)^2$ and $(CoCrPtB)^3$ magnetic layers are coupled unidirectionally by the high magnetic density material Co interposed between the two magnetic layers, thereby allowing enhanced intergranular exchange coupling. Such a structure allows designers the ability and flexibility to use high anisotropy, high magnetization materials that are capable of high exchange coupling in a multilayer structure.

The base pressure typically was maintained in the range of high digits of $10^{-8}$ Torr. The substrates were preheated to around 300° C., and the sputtering pressure was in the range of 1 to 6.1 mTorr. All the metal films were sputtered in Ar gas, with the exception of Co/Ru layers which were produced in Ar, Kr and Xe gases for comparison, and with nominal (about 6.1 mTorr) and low (less than 6.1 mTorr) pressures.

The basic magnetic properties of these media were tested on a non-destructive rotating disc magnetometer. The recording signal and media noise were measured at 600 kfci linear density using a Guzik tester with a giant magnetoresistive (GMR) head that flies at the height of 0.3 inch. The M(H) loops were obtained from a Vibrating Sample Magnetometer (VSM).

Table 1 shows the results of 7 samples of which there are three comparative examples and four examples. The process gas type and pressure for producing Co/Ru layers, the equalized SMNR, as well as exchange coupling strength are tabulated in Table 1. Comparative Example 1 does not have a Co interface layer. 6.1 mTorr refers to the nominal process pressure. For Ar, Kr and Xe, the lowest pressure to start plasma for Co and Ru sputtering was found to be in the range from 1.4 to 3.6 mTorr.

The data in Table 1 shows that AF coupling increased due to the coupling-enhancing Co layer (see Comparative Example 1 and Example 1). Furthermore, for each gas, when the gas pressure was reduced, AF coupling increased by 5 to 20% as compared to the results in which Co and/or Ru were deposited at the nominal 6.1 m Torr. The low pressure Kr processed sample (Example 4) possessed the highest coupling of 0.125 erg/cm$^2$.

Figure 5:
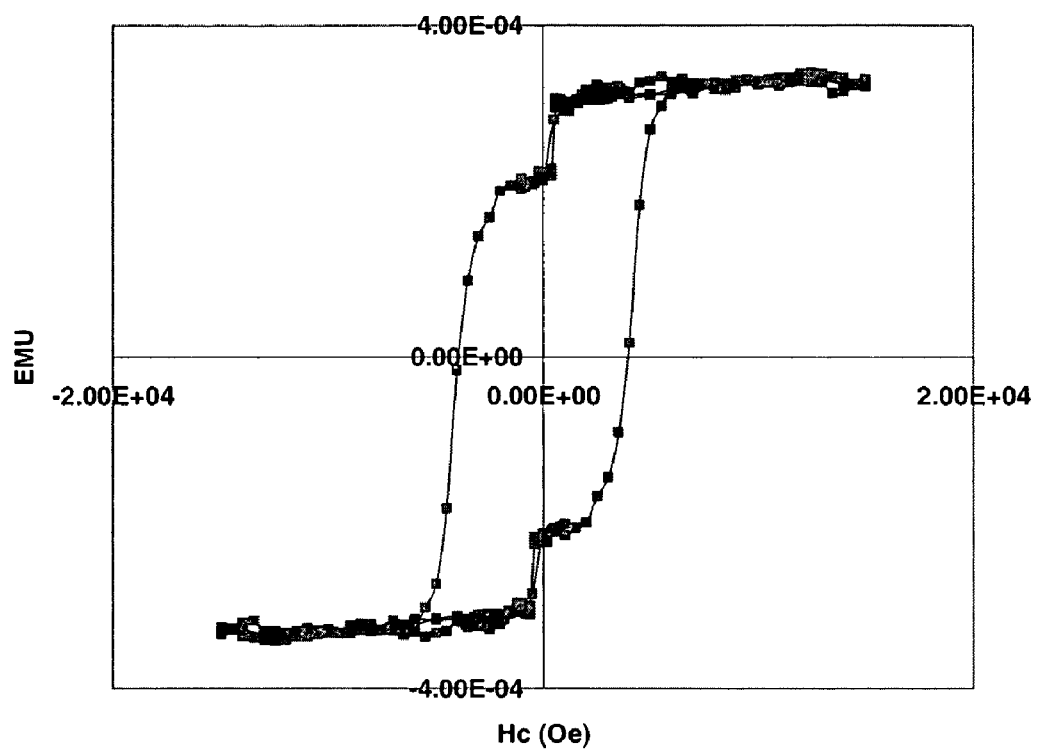
FIG. 5 shows the M(H) loop of the sample of Comparative Example 1.
Figure 6:
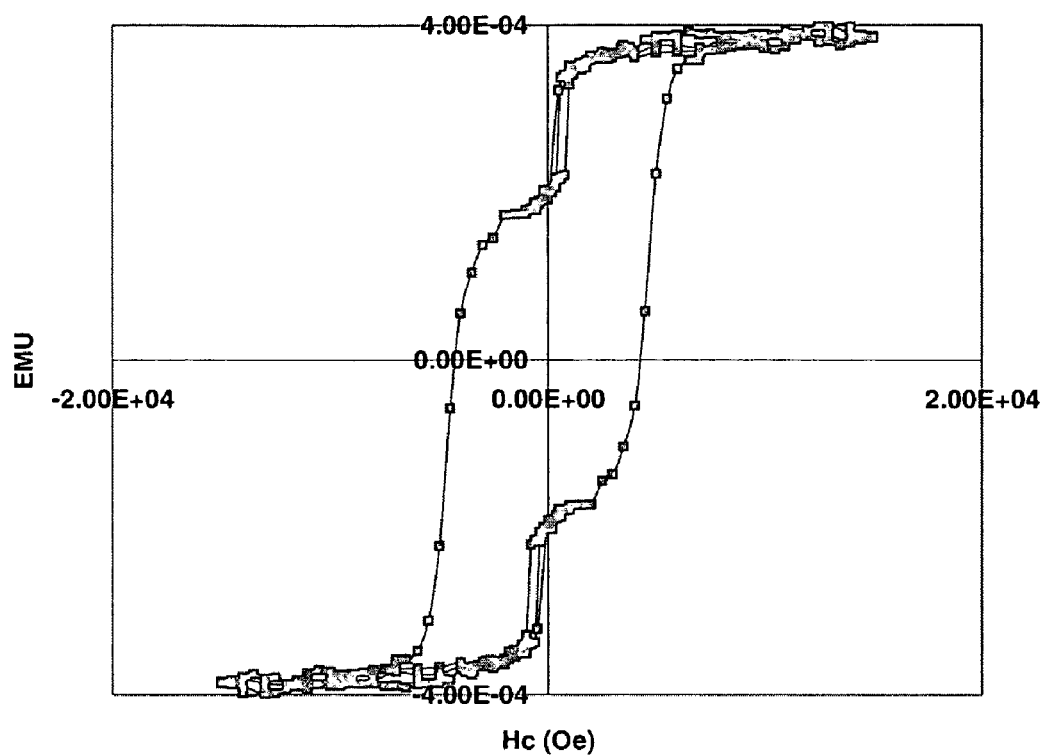
FIG. 6 shows the M(H) loop of the sample of Example 4.

FIGS. 5 and 6 show the M(H) loops for samples Comparative Example 1 and Example 4, respectively. These figures clearly show the increased coupling of the sample of Example 4 as compared to Comparative Example 1, from the increase of both first switching field from 500 to 700 Oe, and the switched magnetization moment of 1.2 to $1.8\times10^{-4}$ emu.

Meanwhile, the recording performance was preserved as shown by eSMNR values in Table 1. The basic magnetic properties—Hcr, Mrt and S*—were similar among the Examples 1–4, while the sample of Comparative Example 1 had slightly higher net Mrt due to less AF coupling.

The improvement of AF coupling with the preservation of recording characteristics is presumably due to the minimized surface and interfacial roughness. Heavier noble gas atoms will have reduced recoil energy at the target surface, and while a substrate bias is applied, at near the substrate as well. Therefore, low pressure of the gas in the Co and/or Ru deposition chamber reduces the scattering of sputtered materials so that smoother and denser films are formed. When low pressure was used for producing these films, a combination of scattering minimization as well as electron heating resulted in better quality of ultra thin films and surfaces/interfaces.

The AF coupling was evaluated by measuring Jex, the exchange energy density of the system, which represents the strength of antiferromagnetic coupling between two magnetic layers. The method for determining Jex was as follows. VSM (vibrating sample magnetometer) was used to measure remanance loop of a sample (cut into a small piece) in the longitudinal direction of sample to determine the field for first switch of remanance, which is Hex. Then, the magnetization that is switched, M, was determined. Jex was calculated by the formula: Jex=Hex*M/(2*A), wherein A is the area of the sample, Hex is in the unit of Oe, M is in the unit of emu, A is in the unit of cm$^2$ and Jex is in the unit of erg/cm$^2$.

TABLE 1

Samples listed with process gas, pressure, eSMNR and AF coupling Jex

| Sample | Gas Type | Co pressure (mTorr) | Ru pressure (mTorr) | eSMNR (dB) | Jex (erg/cm2) |
|---|---|---|---|---|---|
| CE 1* | Ar | | 6.1 | 17.9 | 0.060 |
| CE 2 | Ar | 6.1 | 6.1 | 17.9 | 0.094 |
| CE 3 | Xe | 6.1 | 6.1 | 17.4 | 0.091 |
| E 1 | Ar | 3.6 | 1.9 | 18.1 | 0.101 |
| E 2 | Xe | 2.2 | 2.2 | 17.8 | 0.104 |
| E 3 | Kr | 6.1 | 6.1 | 17.8 | 0.104 |
| E 4 | Kr | 2.4 | 1.4 | 17.7 | 0.125 |

*CE = Comparative Example
**E = Example

Applicants found that the usage of Kr and Xe gases for Co and/or Ru layer sputtering, and a mixture gas of Kr and Ar, or Xe and Ar, or Kr and Xe, results in enhanced exchange coupling in media with AFC structure. Applicants also found that low pressure sputtering (less than 6 mTorr, preferably less than 5 mTorr) to the lowest gas pressure limit that the plasma could be generated and sustained is preferable. Furthermore, substrate bias during the sputtering of Co and/or Ru layers could be used for tuning magnetic properties. Applicants found that the substrate could be Al dominated conductive type, or glass, glass ceramic type, with appropriate seedlayer and/or underlayer and/or intermediate layer structure to establish crystallographic orientation and grain structure. The magnetic alloys could be Co alloys with at least one element from a collection of Cr, Pt, B, Ta, Nb, Si, etc. The magnetic layers for storage and AF coupling could be single layers on top and below Co/Ru films, or multiple adjacent layers, or laminated structure with thin non-magnetic spacing.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

The invention claimed is:

1. A method of manufacturing a magnetic recording medium comprising:
    depositing a first Co-containing layer on a substrate already coated with seedlayer and/or underlayer to promote appropriate crystallographic orientation and grain structure,
    depositing a Co layer on the first Co-containing layer,
    depositing a Ru layer on the Co layer and
    depositing a second Co-containing layer on the Ru layer,
    wherein the Co layer and/or the Ru layer are deposited in a gas environment comprising a moiety selected from the group consisting of Xe, Kr and combinations thereof.

2. The method of manufacturing a magnetic recording medium of claim 1, wherein the gas environment has a gas pressure of less than 6 mTorr.

3. The method of manufacturing a magnetic recording medium of claim 1, wherein the gas environment has a gas pressure of less than 5 mTorr.

4. The method of manufacturing a magnetic recording medium of claim 1, wherein the magnetic recording medium has Jex of 0.1 erg/cm$^2$ or more.

5. The method of manufacturing a magnetic recording medium of claim 1, wherein the magnetic recording medium has Jex of 0.11 erg/cm$^2$ or more.

6. The method of manufacturing a magnetic recording medium of claim 1, further comprising depositing a third Co-containing layer between the underlayer and the first Co-containing layer.

7. The method of manufacturing a magnetic recording medium of claim 1, wherein the Ru layer has a thickness in a range of about 0.1 to 2 nm.

8. The method of manufacturing a magnetic recording medium of claim 1, wherein the thickness of the Co layer is in a range of about 0.1 to 2 nm.

9. The method of manufacturing a magnetic recording medium of claim 1, wherein the magnetic recording medium comprises $Cr/Cr_{90}W_{10}/Co_{77}Cr_8Pt_7B_8/Co_{64}Cr_{12}Pt_6B_8/Co/Ru/Co_{61}Cr_{15}Pt_{12}B_{12}/C$.

10. The method of claim 1, wherein the appropriate crystallographic orientation is a (200) orientation.

11. The method of manufacturing a magnetic recording medium of claim 1, further comprising depositing an additional Co-containing layer directly below the first Co-containing layer.

* * * * *